(12) United States Patent
Burgess et al.

(10) Patent No.: US 9,578,940 B2
(45) Date of Patent: Feb. 28, 2017

(54) PROTECTIVE CASE FOR AN ELECTRONIC DEVICE

(71) Applicant: Thule Organization Solutions, Inc., Niwot, CO (US)

(72) Inventors: Andrew A. Burgess, Boulder, CO (US); Ken O'Rourke, Taichung (TW)

(73) Assignee: Thule Organization Solutions, Inc., Niwot, CO (US)

( * ) Notice: Subject to any disclaimer, the term of this patent is extended or adjusted under 35 U.S.C. 154(b) by 124 days.

(21) Appl. No.: 14/508,288

(22) Filed: Oct. 7, 2014

(65) Prior Publication Data

US 2015/0097009 A1     Apr. 9, 2015

Related U.S. Application Data

(60) Provisional application No. 61/887,826, filed on Oct. 7, 2013.

(51) Int. Cl.
| | | |
|---|---|---|
| *B65D 85/30* | (2006.01) | |
| *A45C 11/00* | (2006.01) | |
| *A45C 13/36* | (2006.01) | |
| *G06F 1/16* | (2006.01) | |
| *H04B 1/3888* | (2015.01) | |

(52) U.S. Cl.
CPC ............ *A45C 11/00* (2013.01); *G06F 1/1628* (2013.01); *H04B 1/3888* (2013.01); *A45C 2011/002* (2013.01); *A45C 2011/003* (2013.01)

(58) Field of Classification Search
CPC ... A45C 11/00; A45C 2011/002; A45C 13/36; A45C 2011/003; H04M 1/04; H04M 1/185; H04M 1/0274; B65D 81/022; G06F 1/1628; H04B 1/3888
USPC .................. 206/320, 305; 455/575.1, 575.8; 361/679.34, 679.36

IPC ..................................... B65D 81/022
See application file for complete search history.

(56) References Cited

U.S. PATENT DOCUMENTS

| | | |
|---|---|---|
| 4,762,227 A | 8/1988 | Patterson |
| 5,335,076 A | 8/1994 | Reh et al. |
| 5,555,157 A | 9/1996 | Moller et al. |
| 5,586,002 A | 12/1996 | Notarianni |
| 5,742,894 A | 4/1998 | Jambhekar et al. |
| 5,990,874 A | 11/1999 | Tsumura et al. |
| 6,031,524 A | 2/2000 | Kunert |

(Continued)

FOREIGN PATENT DOCUMENTS

| | | |
|---|---|---|
| DE | 29811904 | 9/1998 |
| EP | 0924915 | 6/1999 |

(Continued)

OTHER PUBLICATIONS

Official Action for U.S. Appl. No. 29/469,112, mailed Jul. 2, 2015 13 pages.

(Continued)

*Primary Examiner* — Chun Cheung

(74) *Attorney, Agent, or Firm* — Sheridan Ross P.C.

(57) ABSTRACT

A protective case for receiving and retaining a portable electronic device is provided. The case comprises dampening features disposed in at least two corners of the case to protect the electronic device from inadvertent impact and the resultant forces. Various embodiments of the case comprise multi-materials designs and features that allow utilize of various controls and features of the electronic device.

14 Claims, 12 Drawing Sheets

(56) References Cited

U.S. PATENT DOCUMENTS

| | | | |
|---|---|---|---|
| 6,068,119 A | 5/2000 | Derr et al. | |
| 6,132,367 A | 10/2000 | Adair | |
| 6,152,550 A | 11/2000 | Yamaguchi | |
| 6,247,768 B1 | 6/2001 | Yamaguchi | |
| 6,317,313 B1 | 11/2001 | Mosgrove et al. | |
| 6,415,138 B2 | 7/2002 | Siroloa et al. | |
| 6,456,487 B1 | 9/2002 | Hetterick | |
| 6,471,056 B1 | 10/2002 | Tzeng | |
| 6,512,834 B1 | 1/2003 | Banter et al. | |
| 6,536,589 B2 | 3/2003 | Chang | |
| 6,646,864 B2 | 11/2003 | Richardson | |
| 6,654,071 B2 | 11/2003 | Chen | |
| 6,667,738 B2 | 12/2003 | Murphy | |
| 6,995,976 B2 | 2/2006 | Richardson | |
| 7,050,292 B2 | 5/2006 | Shimura et al. | |
| 7,050,712 B2 | 5/2006 | Shimamura | |
| 7,050,841 B1 | 5/2006 | Onda | |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| D557,897 S | 12/2007 | Richardson et al. | |
| 7,312,984 B2 | 12/2007 | Richardson et al. | |
| D581,421 S | 11/2008 | Richardson et al. | |
| D600,908 S | 9/2009 | Richardson et al. | |
| 7,609,512 B2 | 10/2009 | Richardson et al. | |
| 7,616,786 B2 | 11/2009 | Setlak | |
| 7,663,879 B2 | 2/2010 | Richardson et al. | |
| 7,688,580 B2 | 3/2010 | Richardson et al. | |
| 7,889,489 B2 | 2/2011 | Richardson et al. | |
| 7,907,394 B2 | 3/2011 | Richardson et al. | |
| 7,938,260 B2 * | 5/2011 | Lin | A45C 11/00 206/320 |
| D649,539 S | 11/2011 | Hong | |
| D651,201 S | 12/2011 | Fathollahi | |
| D651,791 S | 1/2012 | Cataldo et al. | |
| D655,281 S | 3/2012 | Turocy | |
| D661,646 S | 6/2012 | Son | |
| 8,204,561 B2 | 6/2012 | Mongan et al. | |
| D668,247 S | 10/2012 | Kim et al. | |
| D669,458 S | 10/2012 | Wilson et al. | |
| 8,297,440 B2 | 10/2012 | Schmidt et al. | |
| D671,109 S | 11/2012 | Rothbaum et al. | |
| 8,342,325 B2 | 1/2013 | Rayner | |
| D676,032 S | 2/2013 | Stump et al. | |
| D678,293 S | 3/2013 | Meehan | |
| D678,871 S | 3/2013 | Michan et al. | |
| 8,393,466 B2 | 3/2013 | Rayner | |
| D679,685 S | 4/2013 | Cox | |
| D679,694 S | 4/2013 | Fahrendorff et al. | |
| D682,817 S | 5/2013 | Murchison et al. | |
| D684,567 S | 6/2013 | Murchison et al. | |
| D685,327 S | 7/2013 | Rayner | |
| D686,199 S | 7/2013 | Fahrendorff et al. | |
| 8,483,786 B2 | 7/2013 | Ramies et al. | |
| 8,509,865 B1 * | 8/2013 | LaColla | H04M 1/04 455/556.1 |
| D689,852 S | 9/2013 | Azoulay | |
| 8,526,180 B2 | 9/2013 | Rayner | |
| 8,531,824 B2 | 9/2013 | Rayner | |
| 8,548,541 B2 | 10/2013 | Rayner | |
| 8,564,950 B2 | 10/2013 | Rayner | |
| 8,570,737 B2 | 10/2013 | Rayner | |
| 8,599,547 B2 | 12/2013 | Richardson et al. | |
| 8,644,011 B2 | 2/2014 | Parkinson | |
| 8,660,260 B1 * | 2/2014 | He | H04M 1/00 379/451 |
| D702,672 S | 4/2014 | Mather | |
| 8,708,142 B2 | 4/2014 | Rayner | |
| D709,485 S | 7/2014 | Bishop | |
| 8,767,385 B2 | 7/2014 | Richardson et al. | |
| 8,792,232 B2 | 7/2014 | Richardson | |
| D714,279 S | 9/2014 | McCurry | |
| D714,769 S | 10/2014 | Rayner | |
| D714,771 S | 10/2014 | Rayner | |
| D717,780 S | 11/2014 | Tussy | |
| D719,949 S | 12/2014 | Tussy | |
| D721,065 S | 1/2015 | Yoon | |
| D721,066 S | 1/2015 | Yoon | |
| D721,357 S | 1/2015 | Johnson | |
| 8,950,582 B2 * | 2/2015 | Chang | B65D 81/022 206/521 |
| D730,343 S | 5/2015 | Hemesath et al. | |
| 2002/0195910 A1 | 12/2002 | Hus et al. | |
| 2006/0124482 A1 | 6/2006 | Hodges | |
| 2006/0146649 A1 | 7/2006 | Pappas et al. | |
| 2010/0096284 A1 * | 4/2010 | Bau | B65D 85/00 206/320 |
| 2010/0203931 A1 | 8/2010 | Hynecek et al. | |
| 2012/0154991 A1 | 6/2012 | Lei | |
| 2012/0261306 A1 | 10/2012 | Richardson et al. | |
| 2013/0069499 A1 | 3/2013 | Modrell | |
| 2013/0300267 A1 | 11/2013 | Richardson et al. | |
| 2014/0016217 A1 | 1/2014 | Rayner | |
| 2014/0020947 A1 | 1/2014 | Richardson et al. | |
| 2014/0027317 A1 | 1/2014 | Rayner | |
| 2014/0043740 A1 | 2/2014 | Richardson et al. | |
| 2014/0211387 A1 | 7/2014 | Richardson et al. | |
| 2014/0211388 A1 | 7/2014 | Richardson et al. | |
| 2014/0217863 A1 | 8/2014 | Rayner | |
| 2014/0247545 A1 | 9/2014 | Richardson | |
| 2014/0251368 A1 | 9/2014 | Lawson et al. | |

FOREIGN PATENT DOCUMENTS

| | | |
|---|---|---|
| EP | 1018680 | 7/2000 |
| JP | 2006-514367 | 4/2006 |
| JP | 2006-172974 | 6/2006 |
| KR | 10-2000-0052317 | 8/2000 |
| KR | 10-0599870 | 5/2005 |
| WO | WO 97/45829 | 12/1997 |
| WO | WO 2006/060455 | 6/2006 |
| WO | WO 2012/051358 | 4/2012 |

OTHER PUBLICATIONS

U.S. Appl. No. 11/420,683, filed May 26, 2006.
U.S. Appl. No. 29/429,722, filed Aug. 15, 2012, Rayner.
U.S. Appl. No. 14/281,810, filed May 19, 2014.
U.S. Appl. No. 29/469,112, filed Oct. 7, 2013, Burgess et al.
U.S. Appl. No. 29/497,390, filed Jul. 23, 2014, Burgess et al.
Official Action for U.S. Appl. No. 12/366,769 mailed May 22, 2013, 20 pages.
Notice of Allowance for U.S. Appl. No. 29/436,425, mailed Dec. 17, 2013 13 pages.

* cited by examiner

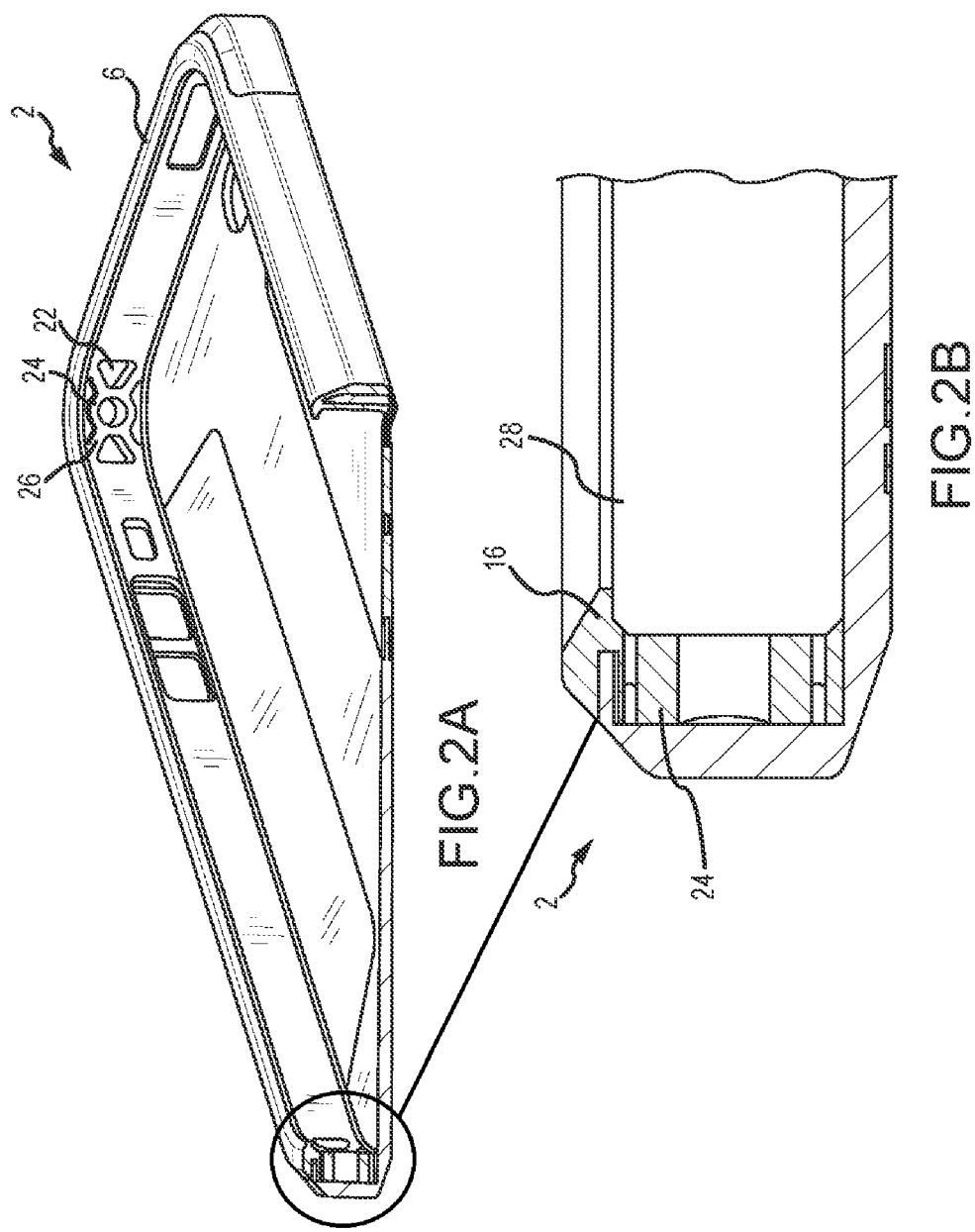

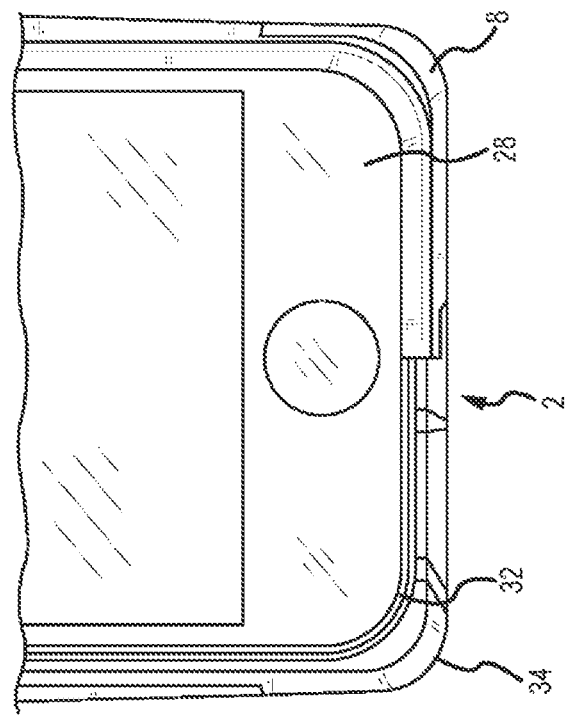
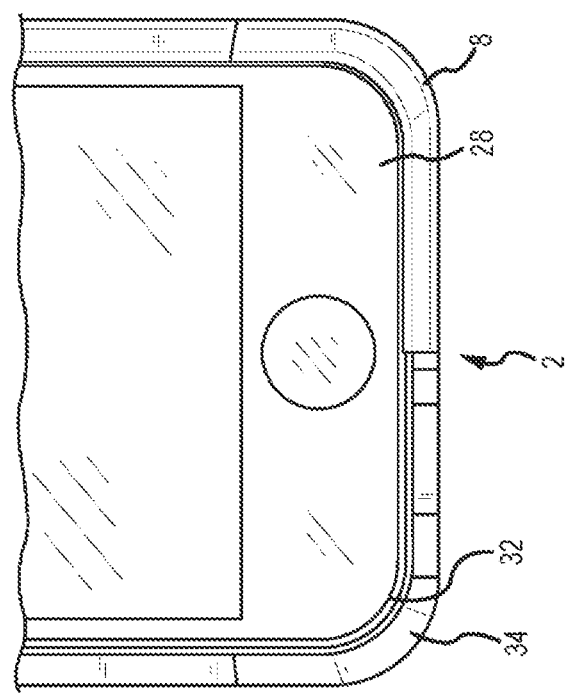

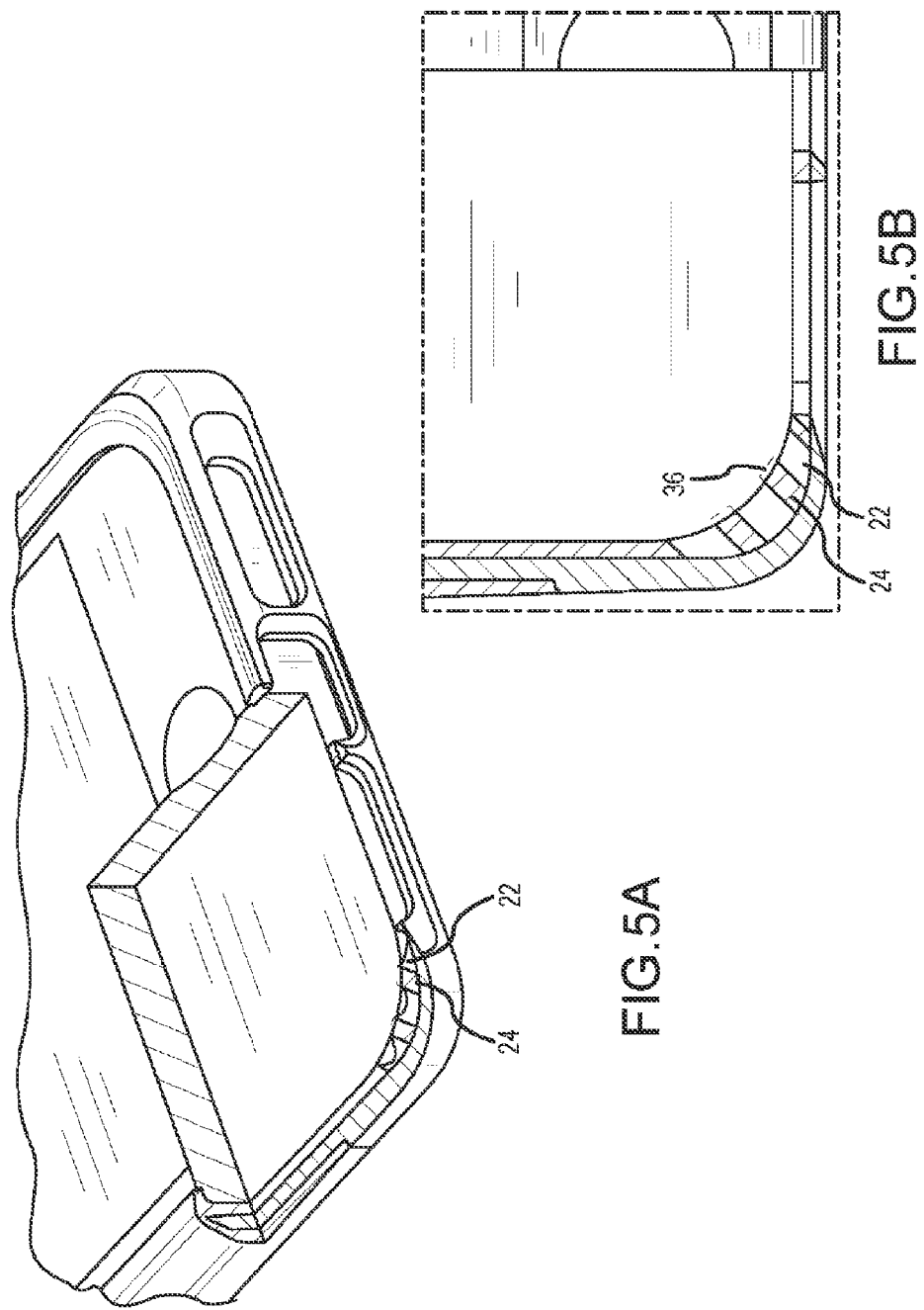

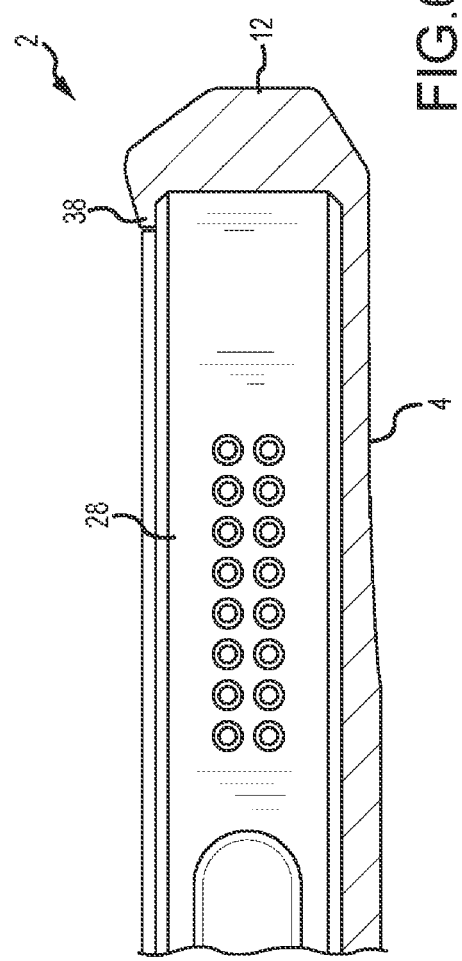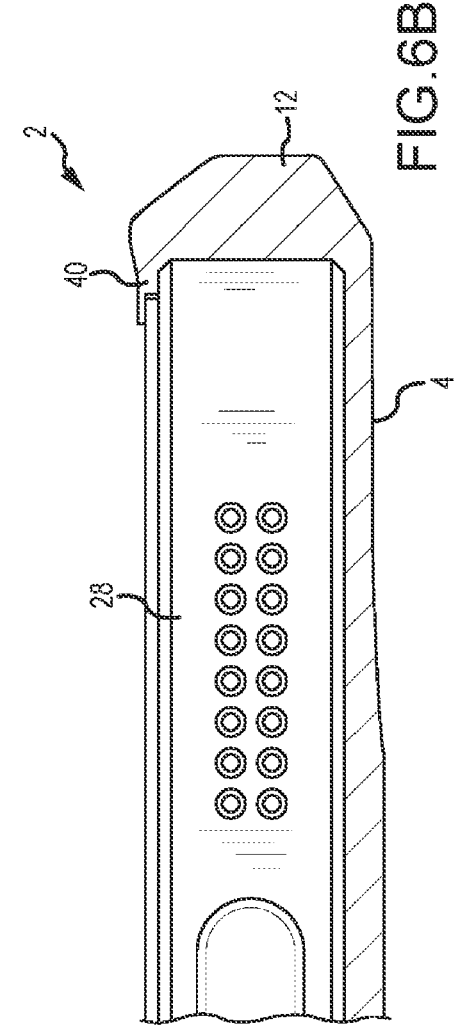

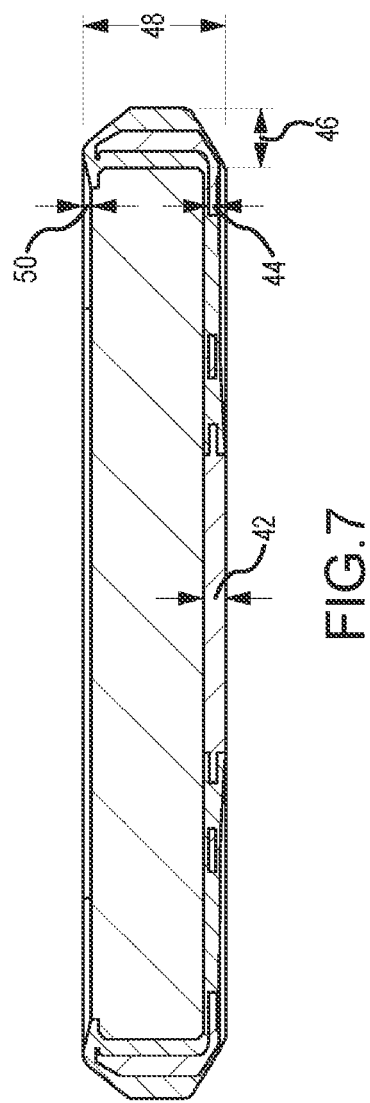

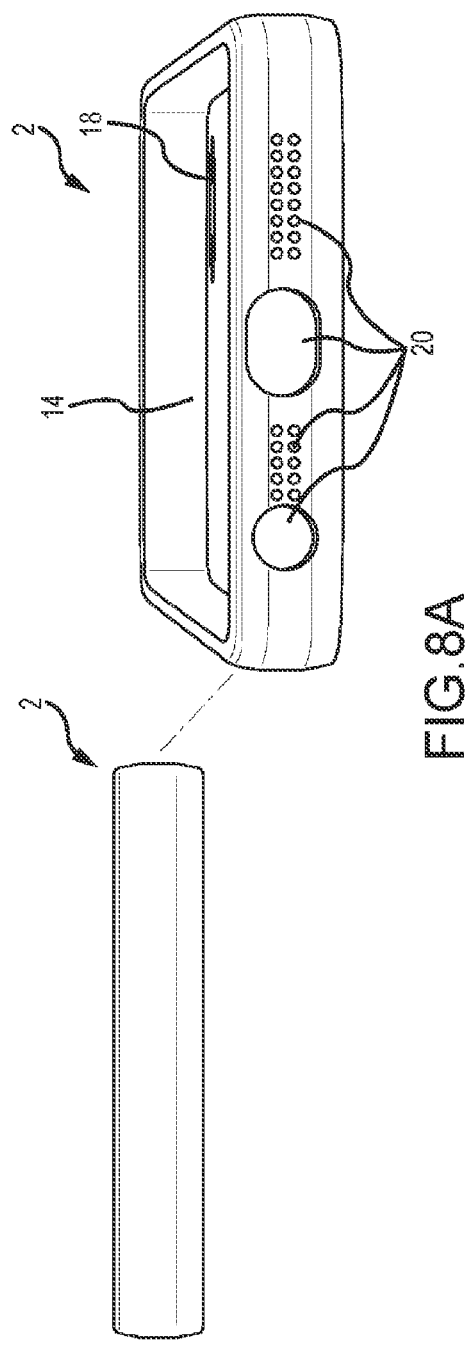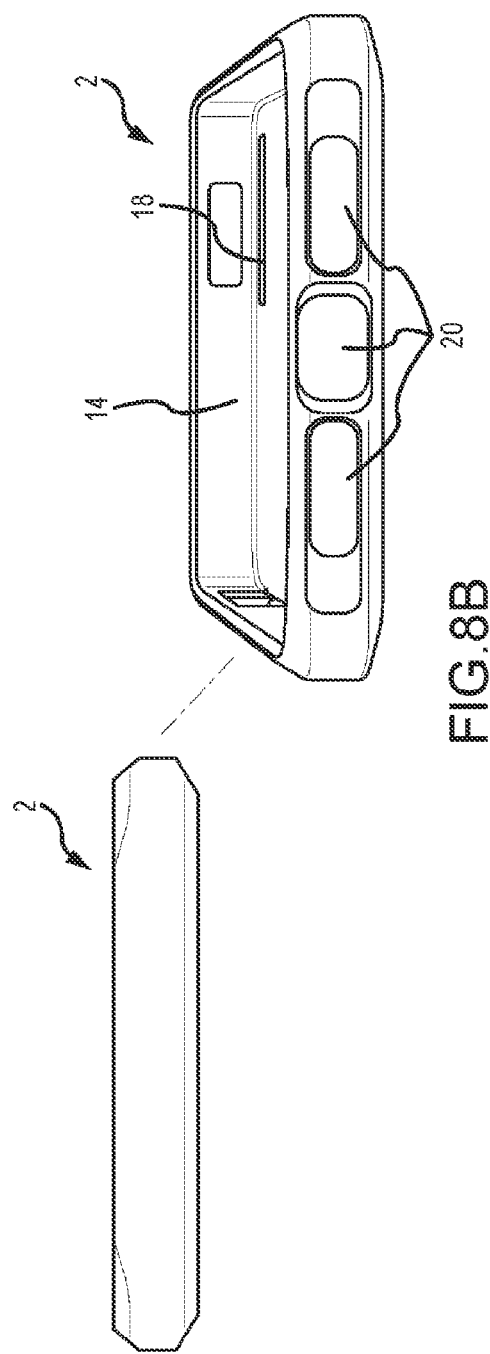

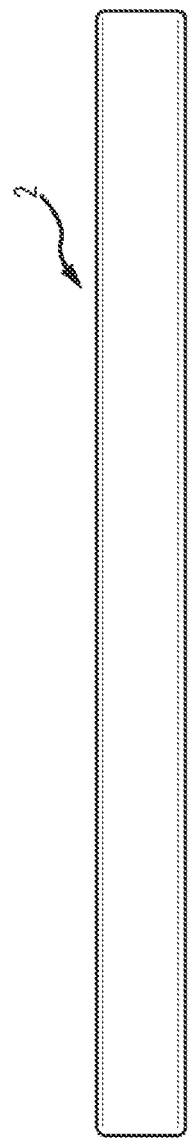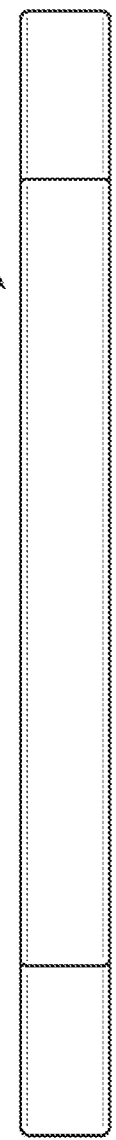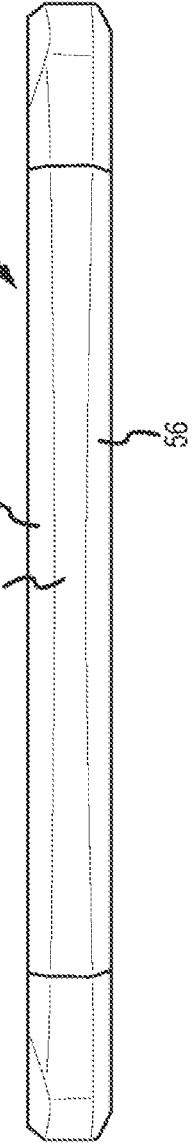

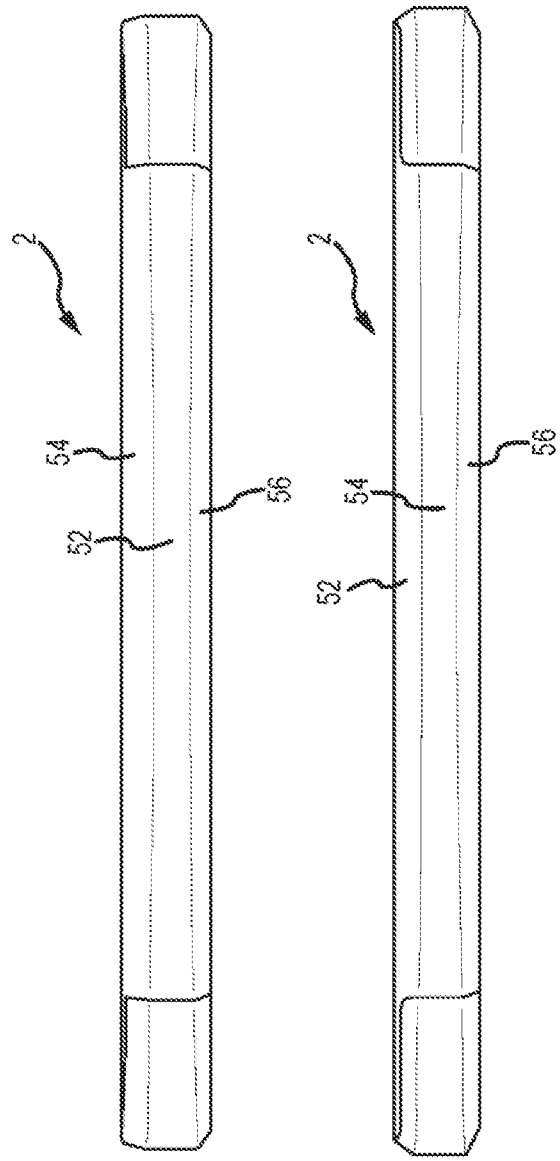

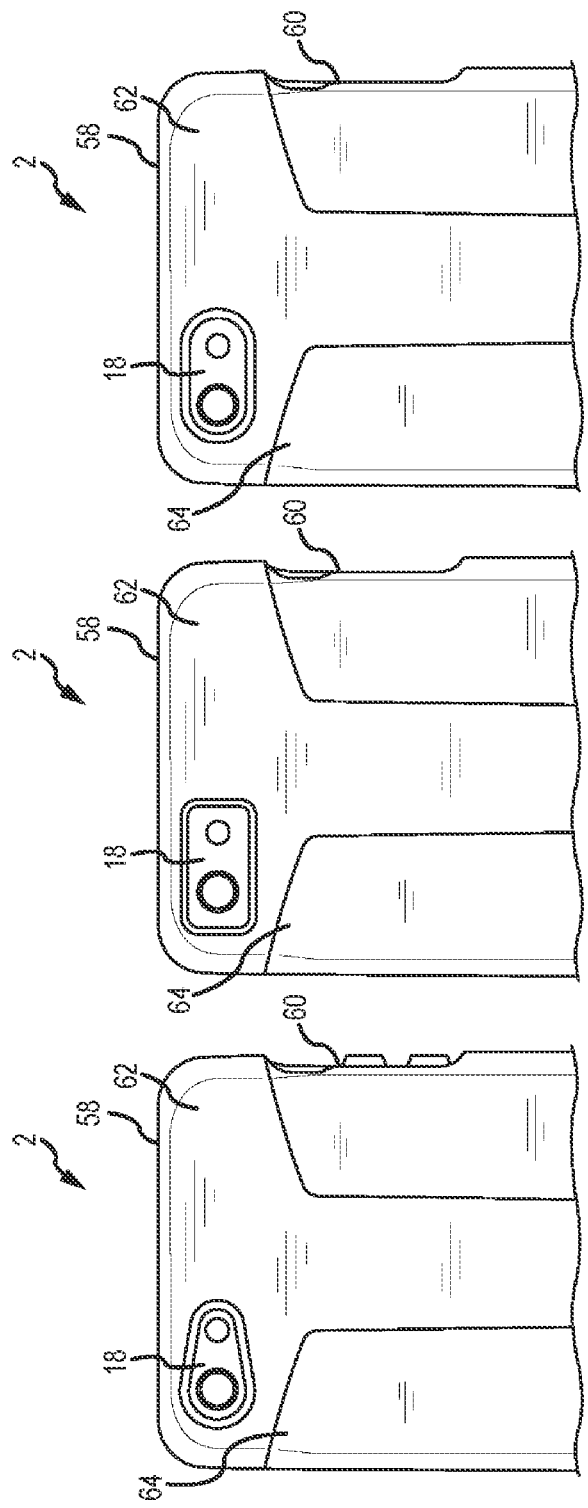

PROTECTIVE CASE FOR AN ELECTRONIC DEVICE

CROSS-REFERENCE TO RELATED APPLICATIONS

This application claims priority under 35 U.S.C. §119(e) to U.S. Provisional Patent Application Ser. No. 61/887,826 filed Oct. 7, 2013 and 62/023,081 filed Jul. 10, 2014, which are incorporated herein in their entirety by reference.

FIELD OF THE INVENTION

The present invention relates generally to protective cases and covers for electronic devices. More specifically, the present invention relates to a protective case for accommodating a variety of portable electronic devices, such as smartphones and tablet computers.

BACKGROUND

Electronic devices such as smart phones, tablet computers and e-readers have become increasingly popular. An inherent convenience of these devices is that they are highly portable. With increased portability, however, comes the need to protect the device from the surrounding environment, impact from drops, abrasion, and other negative influences. Accordingly, as the popularity of the devices continues to increase, so does the need and desire to protect or surround the device with a cost effective protective case. There is a need not only for protecting and transporting electronic devices, but also to accommodate devices of varying sizes, shapes, and having various different features and controls.

Known devices for protecting smartphones and similar items provide a one-piece co-formed hard shell case for surrounding a smartphone. U.S. Pat. No. 8,204,561 to Mongan et al., which is hereby incorporated by reference in its entirety, discloses one such case wherein an elastomer liner is disposed in the hard shell, which adds considerable bulk. This case relies on the material properties of the elastomer lining to protect the smartphone from drops and impulse forces. Thus, such devices fail to provide various novel features of the present invention including various features for receiving, retaining, and protecting a device while still allowing for a preferred level of access to the device.

Other known devices for protecting smartphones include two-piece clamshell designs wherein two rigid portions surround and enclose a portable electronic device. Examples of such devices may be found in U.S. Pat. Nos. 7,609,512 and 6,995,967, which are hereby incorporated by reference in their entirety. However, much like the one-piece co-formed devices, the clamshell designs add considerable bulk to the case-electronic device combination and fail to provide novel features of the present invention.

SUMMARY OF THE INVENTION

Accordingly, the present invention contemplates a novel system and device for a protective case that receives and retains a portable electronic device in a desired position and protects the device against drops and impulse forces. In addition, a protective case is provided with features for accommodating and retaining a variety of electronic devices of various shapes and/or sizes with various features and controls.

It is an aspect of various embodiments of the present invention to provide a protective case that comprises one or more dampening features to protect the electronic device against drops and impulse forces. These dampening features may be disposed on an inner surface of the case, and the dampening features create a predetermined distance between the case and the electronic device. If and when the case and electronic device are dropped or impacted, the dampening features deflect such that the case reduces the impulse force experienced by and/or conveyed to the electronic device. The dampening features may have any number of forms including, but not limited to, ribs that deflect off center, a cylindrical protrusion that compresses in a longitudinal or lateral direction, and an accordion-like arrangement that compresses when the case is dropped.

It is another aspect of embodiments of the present invention to provide a case wherein the dampening feature or features partially deflect when the case receives an electronic device. This partial deflection creates an interference fit between the case and device which reduces the need for other features to retain the electronic device in the case. Preferably, however, the dampening features are not fully deflected upon receiving the electronic device such that the features are adapted to absorb impulse forces. In one embodiment, a case is contemplated that comprises a substantially rigid or non-elastic plastic material and further comprising one or more dampening features comprising thermoplastic polyurethane to enhance the protection properties of the case. In such an embodiment, the case shell comprising a first material and the dampening features comprise a second material wherein the first material comprises a different hardness and/or elasticity than the second material.

In various embodiments, the present invention comprises a co-molded case wherein two or more materials are co-molded or otherwise joined to form a single-piece case for receiving an electronic device. For example, in one embodiment, a substantially rigid plastic material and a substantially elastic rubber material are co-formed or co-molded to produce a one piece case having benefits of both materials. In another embodiment, the case comprises at least two materials, a first material comprising a flexible material for allowing selective manipulation of the case (for example, to allow insertion and removal of a device) and providing impact protection. A second material comprises a substantially rigid material for protecting the device from impact and abrasion and providing a sufficient amount of rigidity to the case. For example, the substantially rigid portion may be provided along a rear-central portion of the case. These materials may include, for example, rubber, nitrile rubber, vinyl, calendared vinyl, cast vinyl, silicone, leather, polyurethane, polyethylene, thermoplastic polyurethane, and various combinations thereof. Embodiments of the present invention may further comprise cases with various protective features including, but not limited to, rigid or hard-shell outer covers, cushioned materials, soft or non-abrasive interior portions to reduce risk of abrasion, etc.

In one embodiment, a case is provided for securing a device, such as a smartphone, wherein the case comprises various apertures and features for allowing access to pre-existing features of a device. Features that may be accommodated with apertures, buttons, or other similar features include, but are not limited to, volume control(s), headphone port(s), power/USB connection(s), speaker(s), and on/off control(s).

In certain embodiments, cases of the present invention comprise low-profile peripheral edges which allow for greater access to a touch screen of a smartphone, for example. Additionally, it is contemplated that embodiments further comprise novel dampening features internal to the case to help secure a smartphone and protect the smartphone from shock, particularly in embodiments where the peripheral edge has been reduced to allow for enhanced access to device features, such as a touchscreen.

A specific embodiment of the present invention provides a case for a portable electronic device comprising a back panel having an inner surface; at least one sidewall having an inner surface, the at least one sidewall extending from the back panel, wherein the inner surface of the at least one sidewall and the inner surface of the back panel at least partially define a storage volume for receiving a portable electronic device; and at least one dampening member interconnected to the at least one sidewall, the dampening member comprising an elastic member capable of elastic deformation.

Another specific embodiment of the present invention is a case for a portable electronic device comprising a back panel having an inner surface; a plurality of sidewalls extending from the flexible back panel, wherein the sidewalls and the flexible back panel at least partially define a storage volume for receiving a portable electronic device; an intersection of at least two of the plurality of sidewalls comprising a dampening member, the dampening member comprising an elastically deformable material; a lip disposed on a distal end of at least one of the sidewalls, wherein the lip is configured to retain the portable electronic device within the storage volume; wherein at least a portion of the back panel and at least a portion of the sidewalls comprise a first material and the dampening member comprises a second material, the first material comprising at least one of a hardness that is greater than a hardness of the second material.

A further embodiment of the present invention is a case for a portable electronic device comprising a back panel, at least a portion of the back panel comprising a first material, at least a portion of the back panel comprising a second material, wherein the first material is more rigid than the second material; a plurality of sidewalls extending from the back panel, each of the plurality of sidewalls extending from the back panel, wherein inner surfaces of the back panel and the plurality of sidewalls at least partially define a storage volume for receiving a portable electronic device; a lip disposed on a distal end of the plurality of sidewalls, wherein the lip is configured to retain the portable electronic device within the storage volume; at least one dampening member comprising an elastomeric material each of the at least one dampening members comprise a cylinder with a longitudinal axis that is substantially parallel to the back panel, and a plurality of supports extending radially from the cylinder, wherein the case comprises four sidewalls extending from the back panel and wherein a dampening member is provided at the intersection of each of the four sidewalls, the dampening members adapted to contact corners of a substantially rectangular electronic device and partially deflect to create an interference fit between the case and the electronic device.

Yet another specific embodiment of the present invention is a case for a portable electronic device comprising a back panel having an inner surface; a plurality of sidewalls extending from the flexible back panel, wherein the sidewalls and the flexible back panel at least partially define a storage volume for receiving a portable electronic device; an intersection of at least two of the plurality of sidewalls comprising a dampening member, the dampening member comprising an elastically deformable material; a lip disposed on a distal end of at least one of the sidewalls, wherein the lip is configured to retain the portable electronic device within the storage volume, the lip defining an opening area; a membrane having an area less than the opening area, wherein the membrane is disposed between the lip and the portable electronic device; wherein at least a portion of the back panel and at least a portion of the sidewalls comprise a first material and the dampening member comprises a second material, the first material comprising at least one of a hardness that is greater than a hardness of the second material.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments.

FIG. 2A is a partial cross-sectional perspective view of one embodiment of the present invention;

FIG. 2B is a partial cross-sectional elevation view of one embodiment of the present invention;

FIGS. 4A-4B are front elevation views of embodiments of the present invention;

FIG. 5A is a partial cross-sectional perspective view of one embodiment of the present invention;

FIG. 5B is a partial cross-sectional top plan view of one embodiment of the present invention;

FIG. 6A is a partial cross-sectional view taken along a bottom sidewall of one embodiment of the present invention;

FIG. 6B is a partial cross-sectional view taken along a bottom sidewall of one embodiment of the present invention;

FIG. 7 is a partial cross-sectional view of left and right sidewalls of one embodiment of the present invention;

FIG. 8A is a bottom perspective view of one embodiment of the present invention;

FIG. 8B is a bottom perspective view of one embodiment of the present invention;

FIGS. 9A-9F are side elevation views of various embodiments of the present invention;

FIGS. 10A-10C are rear elevation views of various embodiments of the present invention;

Figure 1:
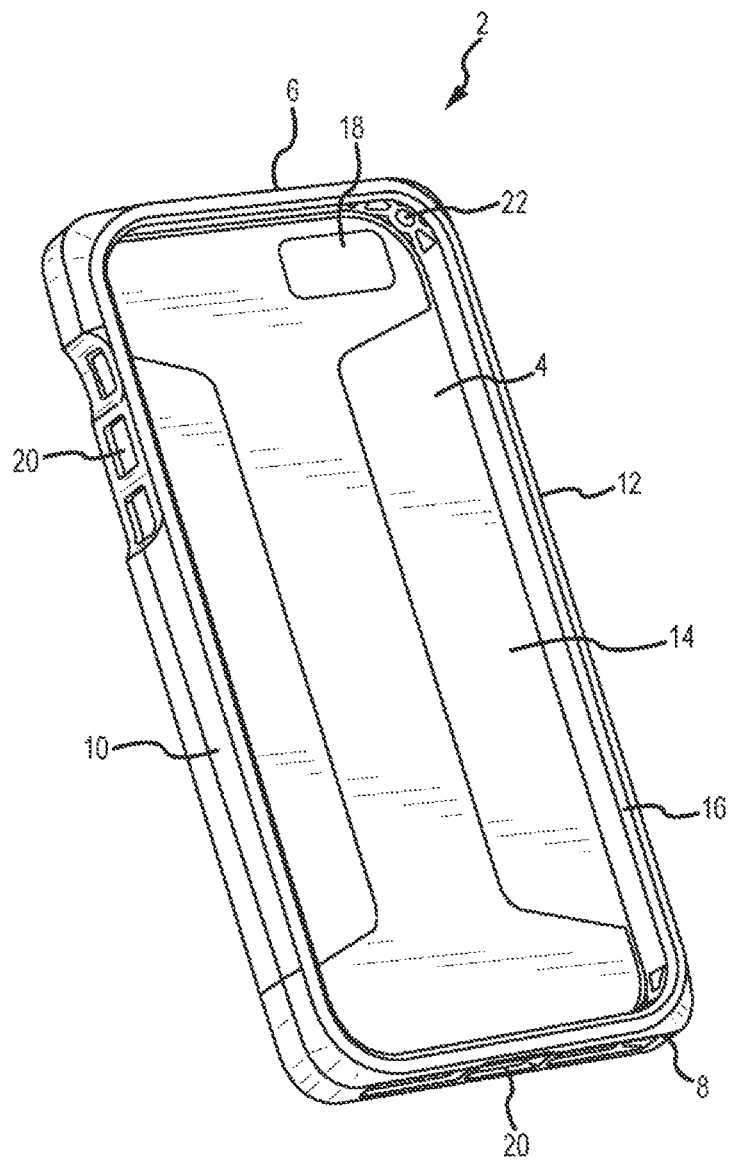
FIG. 1 is a front perspective view of a case according to one embodiment of the present invention.

A list of the various components shown in the drawings and associated numbering is provided herein:

| Number | Component |
| --- | --- |
| 2 | Case |
| 4 | Back Panel |
| 6 | Top Sidewall |
| 8 | Bottom Sidewall |

-continued

| Number | Component |
|---|---|
| 10 | Left Sidewall |
| 12 | Right Sidewall |
| 14 | Storage Volume |
| 16 | Lip |
| 18 | Imaging Aperture |
| 20 | Accessory Feature |
| 22 | Dampening Member |
| 24 | Cylinder |
| 26 | Supports |
| 28 | Device |
| 30 | Rib |
| 32 | Device Radius |
| 34 | Case Radius |
| 36 | Pressure Point |
| 38 | One-Tiered Lip |
| 40 | Two-Tiered Lip |
| 42 | Back Panel Center Thickness |
| 44 | Back Panel Side Thickness |
| 46 | Sidewall Thickness |
| 48 | Sidewall Height |
| 50 | Lip Height |
| 52 | Planar Portion |
| 54 | First Bevel |
| 56 | Second Bevel |
| 58 | Power Aperture |
| 60 | Control Feature Aperture |
| 62 | First Section |
| 64 | Second Section |
| 66 | Gripping Zones |

DETAILED DESCRIPTION

Embodiments of the present invention accommodate a wide variety of portable electronic devices, such as smartphones, particularly those comprising generally planar multi-purpose touch screens. While various embodiments shown and described herein are well suited for housing a smartphone, smaller and larger versions of the protective case are contemplated that are adapted for housing or protecting various devices, such as tablets, e-readers, and various similar devices whether or not currently conceived of.

FIG. 1 is a front perspective view of one embodiment of a case 2. The case 2 typically comprises a substantially rectangular case for receiving a device of similar construction and/or dimensions. Other embodiments may comprise only one sidewall and/or non-opposing sidewalls. The case 2 comprises a plurality of opposing sidewalls, including top 6, bottom 8, left 10 and right 12 sidewalls. The sidewalls 6, 8, 10, 12 in combination with a back panel portion 4 provide for an internal storage volume 14 adapted to receive substantially all of a device (not shown) and protect the same. The case 2 may comprise one or more dampening members 22 positioned in its corners or any other inner surface of the case 2. These dampening members 22 may extend inwardly to create an interference fit with a device such as a smart phone. The case 2 may optionally comprise a peripheral lip 16 for securing a device within the internal storage volume 14 of the case and preventing undesired displacement of the device. Further, the dampening members 22 may absorb impulse forces to the device.

In various embodiments, the case 2 comprises a plurality of access features 20, the access features 20 adapted for allowing access to portions of a stored device including, but not limited to, volume control(s), headphone port(s), power/USB connection(s), speaker(s), on/off control(s), and similar features common to smartphones and similar devices. The back panel portion 4 of the case 2 preferably comprises an imaging aperture 18 for revealing and providing access to pre-existing imaging equipment on a device, such as a lens and flashbulb provided on the device. In various embodiments, the imaging aperture 18 may be sized and shaped to accommodate the specific dimensions and features of a specific device. One skilled in the art will appreciate that the access features 20 and/or the imaging aperture 18 may be overlaid with molding, overmolding, membranes, buttons, and/or any other material or technology commonly used in the art.

FIGS. 2A-2B provide partial cross-sectional perspective views of a case 2 comprising dampening members 22. FIG. 2B shows a detailed view of one of the dampening members 22 in FIG. 2A. Dampening members 22 are preferably provided in each of the four corners (i.e. at the intersections of the sidewalls) of the case 2. However, in alternative embodiments, any number of corners, including just one corner, is/are provided with dampening members 22. Further, the dampening members 22 may be disposed on planar surfaces of the case 2. The dampening members 22 comprise an at least partially elastic material, such a rubber or similar material suitable for protecting a personal electronic device. The peripheral lip 16 is provided and extends over at least a portion of a device (not shown) housed within the case 2. The peripheral lip 16 and dampening member(s) 22 may act in concert to secure a device within the volume of the case 2 and prevent undesired removal or dislocation of the device.

As shown in FIG. 2A, dampening members 22 according to certain embodiments comprise a cylinder 24. In one embodiment, dampening members 22 comprise a hollow cylinder 24 supported by radially extending supports 26. The dampening member 22 may be formed from a flexible portion of the case. In certain embodiments, the dampening members 22 comprise at least one cylinder 24, the cylinder 24 comprising a longitudinal axis provided substantially parallel to a plane of a planar screen of an electronic device when the electronic device is provided within the case, which is also generally parallel to the back panel 4.

Figure 3A:
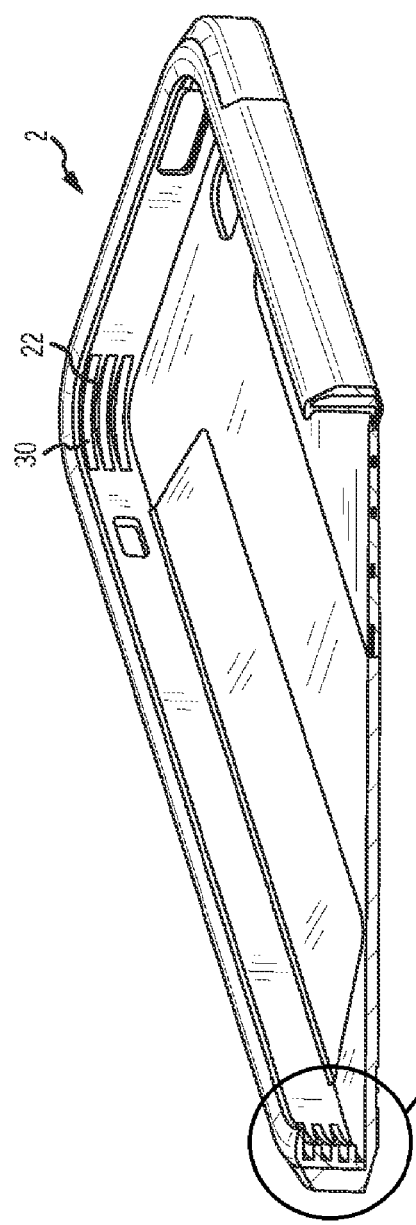
FIG. 3A is a partial cross-sectional perspective view of one embodiment of the present invention.
Figure 3B:
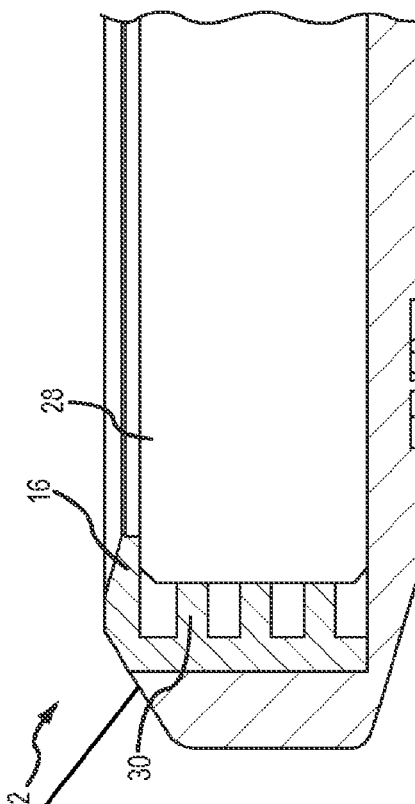
FIG. 3B is a partial cross-sectional elevation view of one embodiment of the present invention.

FIGS. 3A-3B provide partial cross-sectional perspective views of a case 2 comprising dampening members 22, the dampening members 22 comprising parallel ribs 30. FIG. 3B shows a detailed view of one of the dampening members 22 in FIG. 3A. Although three ribs 30 are shown, it will be recognized that the present invention is not limited to any particular number, arrangement, or orientation of these ribs 30. Dampening members 22, extend inwardly to provide compression between the device and the dampening member 22. Such an interference fit for the corners of the case 2 provides a secure connection between the case 2 and the device. Such features reduce the need for additional securing features, such as a peripheral lip 16 that extends over the screen or front surface of a device to an unnecessary degree. Dampening members 22, however, are no greater than the outer dimensions of the dimensions of the predetermined smartphone and, in certain embodiments, extending inwardly at a radius slightly smaller than the smartphone. Thus, when the smartphone is inserted into the internal volume 14 of the case 2, an interference fit is provided with the device or smartphone and the case 2. Preferably, however, dampening members 22 are not so compressed by the smartphone that their dampening effects are negated. In other words, the dampening members 22 range of motion or ability to deflect in compression is not exhausted by fitting the phone into the case 2. Rather, some elastic deformation is still possible if and when the case 2 and phone experience an impact.

FIGS. 4A-4B provide detailed views of corner portions of cases 2 and the devices 28 disposed therein. FIG. 4A provides an embodiment comprising a corner portion with a device radius of curvature 32 and a case radius of curvature 34 that are substantially similar such that wall of the case 2 has a constant thickness. FIG. 4B provides an embodiment comprising a corner portion wherein the device radius of curvature 32 has a larger radius of curvature than the case radius of curvature 34 to provide additional space for dampening members 22, the dampening members 22 also providing the benefit of increased impact protection.

FIG. 5A is a partial cross-sectional view of a case 2 comprising inwardly extending dampening members 22 for securing a device 28. In various embodiments, including embodiments comprising a lipless bezel or a thin-lip bezel (see, e.g., FIGS. 6A and 6B, respectively), the reduction of material in the bezel or peripheral portion provides enhanced access and usability. The present invention further contemplates inwardly extending dampening members 22 for maintaining a device 28 within the case 2 and protecting the device 28.

As shown in FIG. 5B, dampening members 22 are provided in at least one corner of the case. Top 6, bottom 8, left 10, and right 12 sidewalls may generally correspond to the outer dimensions of a phone or electronic device 28. In certain embodiments, dampening members 22 extend inwardly at a radius slightly smaller than a corner radius of a smartphone to be housed, thus creating an interference fit with pressure points 36 between the case and phone. When the smartphone is inserted into the internal volume 14 of the case 2, an interference fit is provided with the device or smartphone and the case 2.

FIGS. 6A-6B are cross-sectional elevation views of cases 2 according to embodiments of the present invention. As shown, a device 28 is provided within the internal volume of the case 2. The cross-sectional showing of the case 2 omits the bottom portion 8 of the case 2 such that the device 28 is visible. The back panel portion 4 and right sidewall portion 12 are shown as partially surrounding the device 28. The embodiment of FIG. 6A depicts a "lip-less bezel" embodiment, wherein the peripheral lip 16 extends over a portion of the front of the device 28, and wherein a single tier lip 38 is provided. FIG. 6B depicts an alternative embodiment wherein a "thin-lip bezel" is contemplated. As shown, the peripheral 14 of FIG. 6B comprises a two-tier 40 arrangement wherein the peripheral lip 16 extends over a first portion (e.g. body portion) and a second portion (e.g. screen portion) of the device 28.

In various embodiments, sidewalls of the case 2 comprise tapered or beveled edges. Tapered edges provide for novel features of the present invention including, for example, a reduced case size, a reduced perceived size-in-hand, facilitation of inserting and withdrawing a phone from pants' pockets, etc., without a significant reduction in the impact-protection properties provided by the case 2. FIG. 6B depicts one such embodiment wherein at least side sidewalls 10, 12 comprise a tapered or beveled feature.

The case 2 of FIGS. 6A and 6B may also comprise a lip-less bezel, wherein various device operations are facilitated by the structure of the case 2. For example, a swiping motion of a user's hand is facilitated by the lip-less bezel embodiment as the screen of the device 28 remains substantially unimpeded by the structure of the case 2. Sidewalls 10, 12 provide protection to sides of the device 28, and the structure of the peripheral lip is such that full access to a screen of the device 28 is provided. It will be expressly recognized that device operation features as shown in FIGS. 6A-6B are also enabled by various embodiments shown and described herein. That is, ease of device 28 operations is not limited to the embodiment of FIGS. 6A-6B.

Now referring to FIG. 7, a cross-sectional elevation view of a case 2 is provided. The dimensions of the left and right sidewalls and the back panel of the case 2 in FIG. 7 are provided. The center of the back panel has a thickness 42. In some embodiments, the back panel center thickness 42 is between approximately 0.5 mm and 3 mm. In various embodiments, the back panel center thickness 42 is between approximately 1 mm and 2 mm. The thickness of the back panel may taper to a smaller size closer to the sidewalls. In some embodiments, the back panel side thickness 44 is between approximately 0.1 mm and 2 mm. In various embodiments, the back panel side thickness 44 is between approximately 0.5 mm and 1.5 mm.

Although various exemplary dimensions are provided herein with respect to certain embodiments, it will be expressly recognized that cases of the present invention are not limited to any particular dimensions and/or proportions. Indeed, the dimensions shown and described herein are provided for illustrative purposes only and do not serve to limit the scope of the invention.

The case 2 in FIG. 7 also has a sidewall thickness 46 and a sidewall height 48. In some embodiments, the sidewall thickness 46 is between approximately 2 mm and 6 mm. In various embodiments, the sidewall thickness 46 is between approximately 3 mm and 5 mm. In some embodiments, the sidewall height 48 is between approximately 7 mm and 12 mm. In various embodiments, the sidewall height 48 is between approximately 9 mm and 11 mm. The distance between the top of the lip and the surface of the screen may be defined as a lip height 50. In some embodiments, the lip height 50 is between approximately 0.1 mm and 2 mm. In various embodiments, the lip height 50 is between approximately 0.3 mm and 1 mm.

FIGS. 8A-8B provide bottom plan views and corresponding bottom perspective views of various embodiments of the present invention. As shown, devices 2 may be formed to custom fit various different devices. For example, cases of the present invention comprise an array or combination of access features 20 to accommodate a specific set of features provided on a pre-existing phone or similar device when the phone is retained within an internal storage volume 14 of the case. Imaging apertures 18 are also provided therein.

FIGS. 9A-9F provide side elevation views of various different embodiments of cases 2 of the present invention. As shown in FIGS. 9C-9F, embodiments of the present invention comprise cases 2 with beveled edges. For example, various embodiments comprise side portions comprising a first bevel 54 and a second bevel 56 separated by a planar portion 52 that is substantially perpendicular to a screen of a device or phone housed within the case. In some embodiments, the height of the planar portion 52 is less than the height of the portable electronic device to provide the feeling of a smaller case 2 to the user. Beveled portions 54, 56 provide for novel features of the present invention including, for example, a reduced case size, a reduced perceived size-in-hand, facilitation of inserting and withdrawing a phone from pants' pockets, etc., without a significant reduction in the impact-protection properties provided by the case. Further, the beveled portions 54, 56 may taper at an angle relative to the back panel or screen of the electronic device. In some embodiments, the bevel angle is between approximately 45° and 75°. One skilled in the art will appreciate embodiments where the bevel angle is not the same between the first bevel 54 and the second bevel 56 or between different sidewalls.

FIGS. 10A-10C provide various rear elevation views of portions of different embodiments of the present invention. As shown, however, the devices comprise similar features of varying structure and dimension. For example, an imaging aperture 18 is provided on each of the cases, but the imaging apertures 18 comprise slightly different shapes, dimensions, and/or orientations to accommodate for device-specific features or styling needs. Similarly, a device control feature aperture 60 is provided on each of the cases, but the size, shape and orientation of the control feature aperture 60 may be varied. In addition, a power aperture 58 is provided on each of the case, but the size, shape and orientation of the power aperture 58 may be varied.

Figures 11A, 11B:
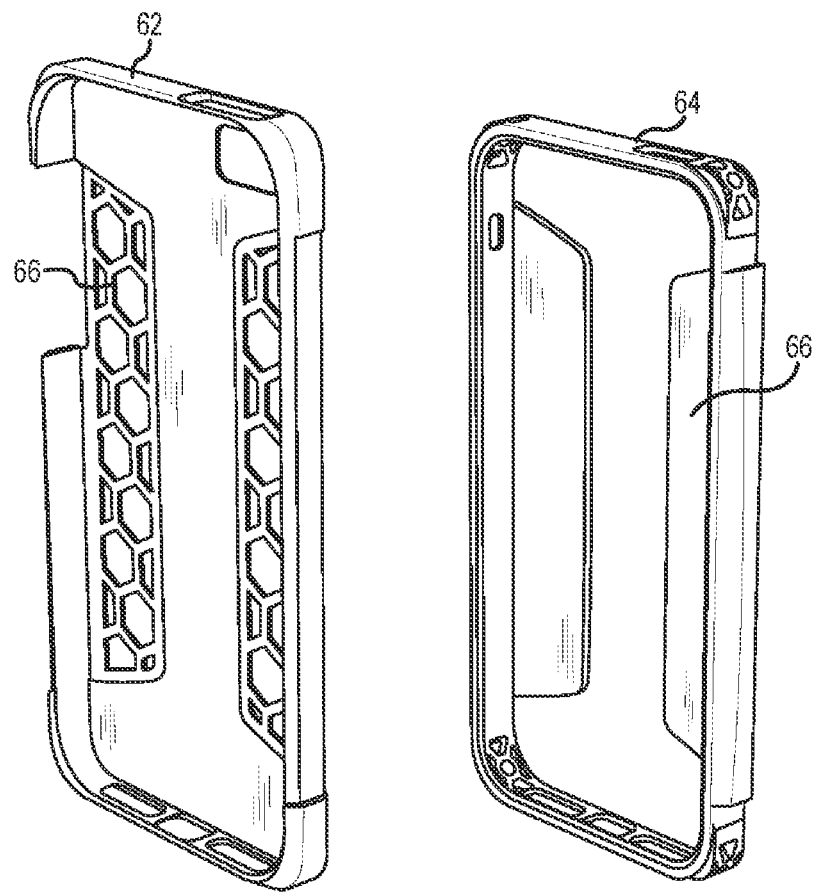
FIGS. 11A-11B are front perspective views of various embodiments of the present invention.
Figure 11C:
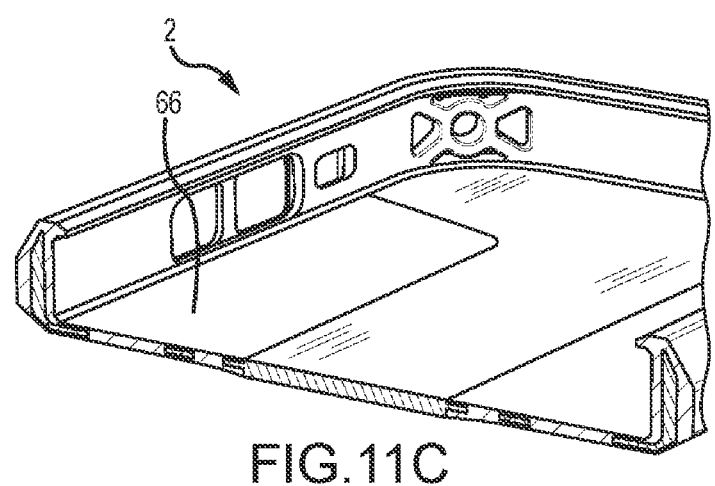
FIG. 11C is a partial cross-sectional perspective view of one embodiment of the present invention.

FIGS. 10A-10C also depict a plurality of portions 62, 64 wherein the portions 62, 64 comprise a different material and/or hardness. These portions 62, 64 are further shown in FIGS. 11A-11C. For example, in one embodiment, a flexible portion 64 is provided integral to a substantially rigid portion 62. The combination of materials provides for the ability to deform the case 2 in certain regions (e.g. the flexible portion 64) and facilitate insertion and removal of a device. A substantially rigid portion 62 is further provided to give structure and support to certain areas of the case 2, such as exterior corner portions and central longitudinal portion of the case 2. In one embodiment, the flexible portion 64 comprises SEBS styrenic block thermoplastic elastomer and the substantially rigid portion 62 comprises a polycarbonate hard structure. The flexible portion 64 may also comprise thermoplastic polyurethane, and one skilled in the art will appreciate that portions 62, 64 may comprise any combination of materials discussed herein or otherwise known in the art. As shown in FIGS. 11A-11C, the flexible portion 64 extends to interior corner portions of the device to provide dampening members for communication with a smartphone or similar device.

The shape of the rigid portion 62 and the flexible portion 64 influences the performance of the case 2. As shown in FIGS. 11A-11C, the rigid portion 62 has a dog-bone shape, meaning the center of the rigid portion 62 is narrower than the entire back panel while the ends of the rigid portion 62 extend toward the four corners of the case 2. The rigid portion 62 not only has a dog-bone shape. The rigid portion 62 also serves as a core for the left sidewall 10 and the right sidewall 12 and the part of the back panel that does not have the dog-bone shape. This void in the dog-bone shape is referred to as the gripping zones 66. The rigid portion 62 that forms a core for the gripping zones 66 may be a honeycomb configuration where a plurality of polygonal shapes provides rigidity and flexibility along with weight savings since the material used for the flexible portion 64 is generally weighs less than the material used for the rigid portion 62. In one embodiment, the polygonal shapes are hexagonal wherein the honeycomb structure is generally parallel to the back panel. Having this honeycomb structure for the rigid portion 62 of the gripping zone 66 core allows for a sufficient amount of flexibility such that the lip and sidewalls of the case 2 deflect and the case 2 receives a portable electronic device. The honeycomb structure also provides enough rigidity to the case 2 such that the case 2 does not deflect a great amount when the case 2 is in a pocket or other otherwise subject to deflection forces.

The materials used for the flexible portion 64 and the rigid portion 62 also influence the friction coefficient of different surfaces of the case 2. In one embodiment, the rigid portion 62 is a polycarbonate material and the flexible portion 64 is a thermoplastic material wherein the rigid portion 62 has a friction coefficient that is less than the flexible portion 64. Thus, since the gripping zone 66 allows a user to more securely grip the case 2 and the portable electronic device, and the dog-bone shape of the rigid portion 62 allows the case 2 to slide easily into a user's pocket or other confined compartment. One skilled in the art will appreciate embodiments where the case 2 has a single friction coefficient or the rigid portion 62 has a greater friction coefficient than the flexible portion 64, and one skilled in the art will appreciate embodiments where the portions 62, 64 have other differing qualities such as hardness.

The arrangement of the flexible portion 64 and the rigid portion 62 allow for more efficient manufacturing. The rigid portion 62 forms the dog bone shape on the back panel and serves as the core material for the gripping zones 66. The rigid portion 62 also serves as the core material for the left sidewall 10 and the right sidewall 12 while the top and bottom sidewalls may be comprised only of the rigid portion 62. The flexible portion 64 fills in the gripping zones 66 of the back panel, surrounds the left and right sidewalls, and may serve as a liner for the inner surface of the case 2. Thus, the continuous shapes of the rigid portion 62 and the flexible portion 64 streamline the manufacturing process since a single pour of material would flow through every part of the rigid portion 62 and/or the flexible portion 64.

In various embodiments, cases of the present invention comprise multiple part construction. For example, it is contemplated that a case 2 comprises a first material forming certain portions of the case, such as a plastic forming the top portion 6 of the device, and a second material forming additional portions of the case 2, such as a rubber material forming the dampening feature(s) 22 of the device. The different materials may be inlaid or co-molded to form the appropriate combination of materials.

What is claimed is:

1. A case for a portable electronic device comprising:
    a back panel having an inner surface;
    a top wall, a bottom wall, a left wall, and a right wall, each wall having an inner surface, each of said walls extending from said back panel, wherein said inner surfaces of said walls and said inner surface of said back panel at least partially define a storage volume for receiving a portable electronic device, and wherein a first radius of curvature is formed at an intersection between one of said top wall and said bottom wall and one of said left wall and said right wall; and
    at least one dampening member interconnected to said walls, said dampening member comprising an elastic material capable of elastic deformation, and said dampening member forming a second radius of curvature, wherein said second radius of curvature is larger than said first radius of curvature;
    wherein said dampening member comprises a cylindrical member having a longitudinal axis, said longitudinal axis oriented substantially parallel to a plane of a planar screen of said portable electronic device when said portable electronic device is provided within the case, and wherein said cylindrical member has an aperture extending through said dampening member;
    wherein said dampening member comprises at least one support member extending radially from said cylindrical member, said at least one support member defining at least another aperture extending through said dampening member.

2. The case of claim 1, further comprising a lip disposed on a distal end of said walls and extending inwardly to at least partially define said storage volume.

3. The case of claim 1, wherein four dampening members are provided, and four intersections are formed by said walls, wherein a dampening member is disposed proximate to each intersection of said walls.

4. The case of claim 1, wherein the inner surfaces of said walls and said at least one dampening member form a perimeter, and wherein said perimeter is less than a perimeter of an electronic device to be received within the case such that said dampening member is configured to resiliently deform to an exterior of said electronic device.

5. The case of claim 1, wherein said walls each have a wall thickness, and wherein said difference between said first radius of curvature and said second radius of curvature forms a maximum thickness of said at least one dampening member, wherein said maximum thickness is larger than said wall thickness.

6. The case of claim 1, wherein said dampening member comprises a plurality of ribs that form a plurality of apertures extending through said dampening member.

7. A case for a portable electronic device comprising:
a flexible back panel having an inner surface;
a plurality of walls extending from said flexible back panel, wherein said walls and said flexible back panel at least partially define a storage volume for receiving a portable electronic device;
an intersection of at least two of said plurality of walls comprising a dampening member, the dampening member comprising an elastically deformable material, wherein said dampening member comprises a cylindrical member having a longitudinal axis, said longitudinal axis oriented substantially parallel to a plane of a planar screen of said portable electronic device when said portable electronic device is provided within the case, said cylindrical member having an aperture extending through said dampening member;
a lip disposed on a distal end of at least one of said walls, wherein said lip is configured to retain said portable electronic device within said storage volume;
wherein at least a portion of said flexible back panel and at least a portion of said walls comprise a first material and said dampening member comprises a second material, said first material comprising a hardness that is greater than a hardness of the second material.

8. The case of claim 7, wherein four dampening members are provided, and four intersections are formed by a top wall, a bottom wall, a left wall, and a right wall, wherein a dampening member is disposed proximate to each intersection said walls.

9. The case of claim 7, wherein said dampening member comprises at least one support member extending radially from said cylindrical member, said at least one support member defining at least another aperture extending through said dampening member.

10. The case of claim 7, wherein the inner surfaces of said walls and said dampening member form a perimeter, and wherein said perimeter is less than a perimeter of said portable electronic device to be received within the case such that said dampening member is configured to deform to accommodate said portable electronic device.

11. The case of claim 7, wherein an outer surface and ad an inner surface of said dampening member form an outer radius of curvature and an inner radius of curvature, respectively, wherein said inner radius of curvature is larger than said outer radius of curvature.

12. A case for a portable electronic device comprising:
a back panel, at least a portion of said back panel comprising a first material, at least a portion of said back panel comprising a second material, wherein said first material is more rigid than said second material;
a plurality of walls extending from said back panel, each of said plurality of walls extending from said back panel, wherein inner surfaces of said back panel and said plurality of walls at least partially define a storage volume for receiving a portable electronic device;
a lip disposed on a distal end of said plurality of walls, wherein said lip is configured to retain said portable electronic device within said storage volume;
at least one dampening member comprising an elastomeric material, each of said at least one dampening members comprise a cylinder with a longitudinal axis that is substantially parallel to said back panel, and a plurality of supports extending radially from said cylinder, wherein said cylinder and said plurality of supports define a plurality of apertures in each of said at least one dampening members;
wherein said case comprises four intersections formed by a top wall, a bottom wall, a left wall, and a right wall extending from said back panel, and wherein a dampening member is provided at each intersection of said walls, said dampening members adapted to contact corners of said portable electronic device having a substantially rectangular shape and to partially deflect to create an interference fit between said case and said electronic device.

13. The case of claim 12, wherein said dampening member comprises a lower hardness than at least one of said back panel and said plurality of walls.

14. The case of claim 12, wherein a first radius of curvature is formed at said intersection of two walls, and said corresponding dampening member forms a second radius of curvature, wherein said second radius of curvature is larger than said first radius of curvature.

* * * * *